(12) United States Patent
Takano et al.

(10) Patent No.: US 7,301,385 B2
(45) Date of Patent: Nov. 27, 2007

(54) METHODS AND APPARATUS FOR MANAGING CLOCK SKEW

(75) Inventors: Chiaki Takano, Austin, TX (US); Stephen D. Weitzel, Round Rock, TX (US)

(73) Assignees: Sony Computer Entertainment Inc., Tokyo (JP); International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/233,423

(22) Filed: Sep. 22, 2005

(65) Prior Publication Data

US 2007/0063756 A1    Mar. 22, 2007

(51) Int. Cl.
*G06F 1/04* (2006.01)

(52) U.S. Cl. .............. 327/292; 327/293; 365/233

(58) Field of Classification Search ........... 327/108, 327/291–299; 713/500; 716/6, 21; 365/233
See application file for complete search history.

(56) References Cited

U.S. PATENT DOCUMENTS 7,046,066 B2 *   5/2006   Saado et al. ............... 327/291

FOREIGN PATENT DOCUMENTS

| JP | 2003-173361 | 6/2003 |
| JP | 02003173361 | * 9/2006 |

* cited by examiner

*Primary Examiner*—Dinh T. Le
(74) *Attorney, Agent, or Firm*—Matthew B. Dernier, Esq.; Kaplan Gilman Gibson & Dernier LLP

(57) ABSTRACT

An apparatus is disclosed which includes a signal generator providing a first signal having a first frequency; a clock tree operative to propagate the first signal to at least one clock mesh of the apparatus; and a final buffer operative to receive the first signal, provide a second signal having a second frequency, synchronize the second signal with the first signal, and propagate the synchronized second signal to at least one other clock mesh of the apparatus.

20 Claims, 9 Drawing Sheets

METHODS AND APPARATUS FOR MANAGING CLOCK SKEW

BACKGROUND OF THE INVENTION

The present invention relates to managing clock skew when separate clock meshes are employed to provide different clock frequencies to different portions of a large scale integrated (LSI) circuit.

A system clock signal is often used by digital circuitry, such as digital circuitry implemented using a LSI circuit, to synchronously execute certain logic functions. For example, ultra-deep sub-micron (UDSM) microprocessors employ digital circuitry that use system clock signals to synchronously execute logic functions. These microprocessors operate at system clock frequencies of 1 GHz and higher. The system clock signal of a given LSI circuit is often split into many paths to service many different portions of the digital circuitry. Ideally, the system clock signals at different portions of the digital circuitry exhibit exactly the same timing characteristics so that the different portions of the digital circuitry operate in exact synchronization. In practice, however, the system clock signals at various points throughout the digital circuitry exhibit differing timing characteristics, such as differing rising and/or falling edges (i.e., transitions), differing duty cycles, and/or differing frequencies. These non-ideal characteristics are often referred to as clock jitter and clock skew.

Clock jitter relates to the inaccuracies inherent in generating the system clock signal. The non-ideal characteristics of the system clock signals due to clock jitter affect all portions of the LSI circuit in the same way, irrespective of how the system clock signals are distributed to those portions of the circuit. Clock skew relates to the inaccuracies introduced into the system clock signals by the distribution technique employed to split the system clock into many paths and deliver the clock signals to different portions of the digital circuit.

Sources of clock skew may be classified as being statically occurring or dynamically occurring. Statically occurring sources of clock skew are caused by the LSI design or manufacturing process irrespective of the operating conditions of the LSI circuit. Dynamically occurring sources of clock skew are caused by the operating conditions of the LSI circuit, which may also be functions of the LSI circuit design or manufacturing process.

Statically occurring sources of clock skew include (i) variations in transistor load capacitance (e.g., gate load capacitance); (ii) RC delay of circuit interconnections (e.g., the asymmetry of wire lengths and widths); (iii) variations and/or asymmetries in cross-coupling capacitance between wires (e.g., inter-wiring capacitance); and (iv) semiconductor process variations (e.g., transistor threshold voltage variations, transistor ON resistance variations, wiring variations, vias, and contact RC variations).

Dynamically occurring sources of clock skew include (i) cross-coupling between wire lengths due to inter-wiring capacitance; (ii) cross-coupling between wire lengths due to inductive coupling; (iii) cross-coupling due to return path current; (iv) temperature variations; and (v) variations in VDD and VSS (e.g., DC operating voltage variations).

Unfortunately, the variations in the timing characteristics of the system clock signals due to clock skew result in undesirable errors in the operation of the digital circuitry of the LSI circuit. The problem is exacerbated as the size (i.e., number of logic gates and corresponding circuit area) increase and/or as the clock signal frequency increases.

Various techniques have been developed and employed to ameliorate the undesirable affects of clock skew. These techniques include (i) utilizing clock bars (i.e., relatively wide bars to carry the system clock to various portions of the LSI circuit); (ii) RC delay balancing (i.e., wiring techniques that focus on wiring geometry to match RC delay characteristics); (iii) utilizing a grid structure in distributing the system clock signal; (iv) utilizing a hierarchical structure in partitioning the LSI circuit into regions; (v) utilizing active feedback in compensating the system clock signal; (vi) utilizing local oscillators in various regions of the LSI circuit and an overall resonance for the LSI circuit; and (vii) utilizing the resonances of wiring loops. For various reasons, these techniques have not been adequately successful in addressing the undesirable problems caused by clock skew.

FIG. 1 is a schematic diagram of a circuit 100 in which a single clock signal is distributed to a clock mesh 106 via a clock tree 104 employing a conventional approach. After the signal emerges from the PLL (Phase-Locked Loop), OSC (Oscillator) or other clock source 102, the signal branches off along several possible paths within clock tree 104 before reaching clock mesh 106. A plurality of clock buffers 108 are used to fan the clock signal out to multiple points on the clock mesh 106. Various points in circuit 100 will experience clock skew for all the reasons discussed above.

FIG. 2 is a schematic diagram of a circuit 200 in which two separate clock signals, at different frequencies, are distributed to respective meshes 206 and 216 along separate respective clock trees 204 and 214. The clock skew problem is exacerbated when separate clock trees and separate clock meshes are employed to deliver different clock frequencies to different portions of a circuit.

FIG. 2 illustrates a conventional approach for implementing a 4-GHz (gigahertz) clock mesh 206 and a 2 GHz clock mesh 216. Circuit 200 accomplishes this by providing a ½ frequency divider 212 coupled to the output of 4 GHz oscillator 202 and by providing separate clock trees 204, 214 to deliver the 4 GHz and 2 GHz clock signals, respectively, to the 4 GHz clock mesh 206 and the 2 GHz clock mesh 216, respectively. Employing this configuration, the point of synchronization between the two signals is located where the 4 GHz signal is directed to the frequency divider 212 to generate the 2 GHz signal. From that point onward, as the signals propagate along their respective clock trees toward their respective clock meshes, clock skew will generally become progressively worse as each length of wire and each device through which each signal travels introduces another opportunity for disparities in the speed of propagation of the respective signals to arise.

FIG. 3 is a timing diagram illustrating clock skew occurring within the circuit of FIG. 2. Graph 302 is a plot of the 4 GHz signal at the output of the oscillator 202. Graph 304 is a plot of the 2 GHz signal generated from the 4 GHz signal at the output of the ½ frequency divider 212, under ideal conditions. Graphs 306 and 308 illustrate 2 GHz clock signals that may appear at different points in the clock mesh 216. Clock skew for the 2-GHz signals, illustrated by graphs 306 and 308, with respect to the 4 GHz signal illustrated by graph 302 is apparent.

Conventional techniques for reducing the resulting clock skew between separate meshes are very complex. Accordingly, there is a need in the art for a simpler solution to the problem of clock skew between clock meshes operating at different frequencies.

SUMMARY OF THE INVENTION

According to one embodiment, the invention provides an apparatus, comprising: a signal generator providing a first signal having a first frequency; a clock tree operative to propagate the first signal to at least one clock mesh of the apparatus; and a final buffer operative to receive the first signal, provide a second signal having a second frequency, synchronize the second signal with the first signal, and propagate the synchronized second signal to at least one other clock mesh of the apparatus. Preferably, the final buffer is operable to divide the first frequency by a divisor to provide the second signal having the second frequency. Preferably, the clock tree is connected to the signal generator. Preferably, the at least one clock mesh is connected to the clock tree. Preferably, the at least one clock mesh comprises a plurality of clock meshes. Preferably, the final buffer comprises: a frequency divider for receiving the first signal and providing the second signal having the second frequency; and a synchronization circuit for synchronizing the second signal with the first signal.

Preferably, the frequency divider comprises a flip flop circuit operable to receive the first signal, divide the first frequency by a divisor, and provide the second signal having the second frequency to the synchronization circuit. Preferably, the synchronization circuit comprises a digital logic circuit operable to receive the first signal and the second signal, to perform at least one logical operation on the first and second signals, and to provide the synchronized second signal as an output. Preferably, the digital logic circuit comprises at least one of: an AND gate, a NAND gate, an OR gate, and a NOR gate. Preferably, the second frequency is lower than the first frequency. Preferably, the frequency divider is operable to: discontinue the propagation of the synchronized second signal to the at least one other clock mesh. Preferably, the synchronization circuit is operable to at least one of: synchronize a rising edge of the second signal with a rising edge of the first signal; synchronize a falling edge of the second signal with a falling edge of the first signal; synchronize a rising edge of the second signal with a falling edge of the first signal; and synchronize a falling edge of the second signal with a rising edge of the first signal.

According to another embodiment, the invention provides a method, comprising: providing a first signal having a first frequency; propagating the first signal through a clock tree to at least one clock mesh of an apparatus; generating a second signal having a second frequency; synchronizing the second signal with the first signal; and propagating the synchronized second signal to at least one other clock mesh of the apparatus. Preferably, generating the second signal comprises dividing the first frequency by a divisor. Preferably, the divisor is about 2. Preferably, the synchronizing comprises: synchronizing the second signal with the first signal employing a digital logic circuit. Preferably, synchronizing employing the digital logic circuit comprises: receiving the first and second signals; performing at least one logical operation on the first and second signals; and providing as output from the digital logic circuit the synchronized second signal. Preferably, the digital logic circuit comprises: at least one of: an AND gate, a NAND gate, an OR gate, and a NOR gate. Preferably, dividing comprises: discontinuing the propagation of the synchronized second signal to the at least one other clock mesh. Preferably, synchronizing comprises at least one of: synchronizing a rising edge of the second signal with a rising edge of the first signal; synchronizing a falling edge of the second signal with a falling edge of the first signal; synchronizing a rising edge of the second signal with a falling edge of the first signal; and synchronizing a falling edge of the second signal with a rising edge of the first signal.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
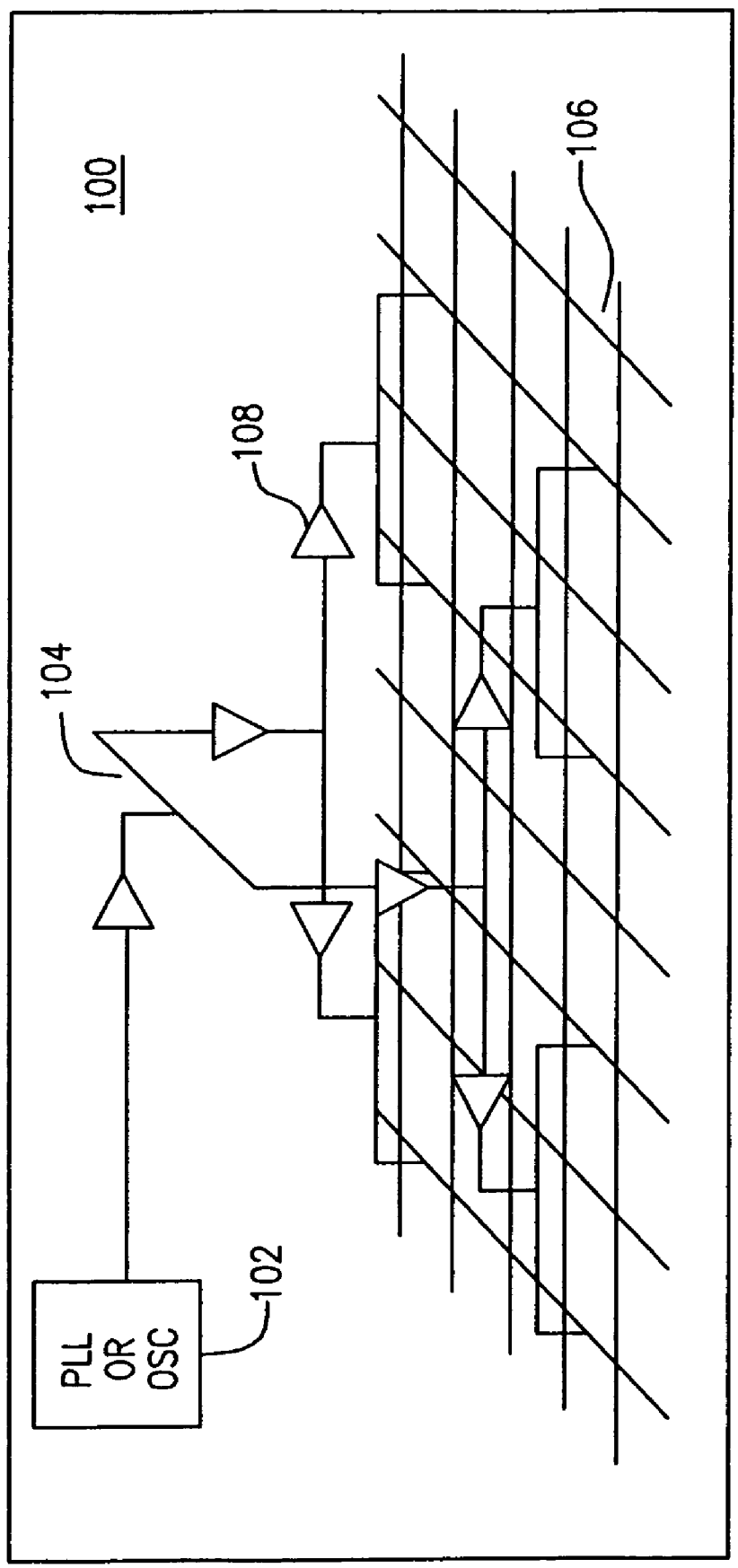
FIG. 1 is a schematic diagram of a circuit in which a single clock signal is distributed to a clock mesh via a clock tree employing a conventional approach.
Figure 2:
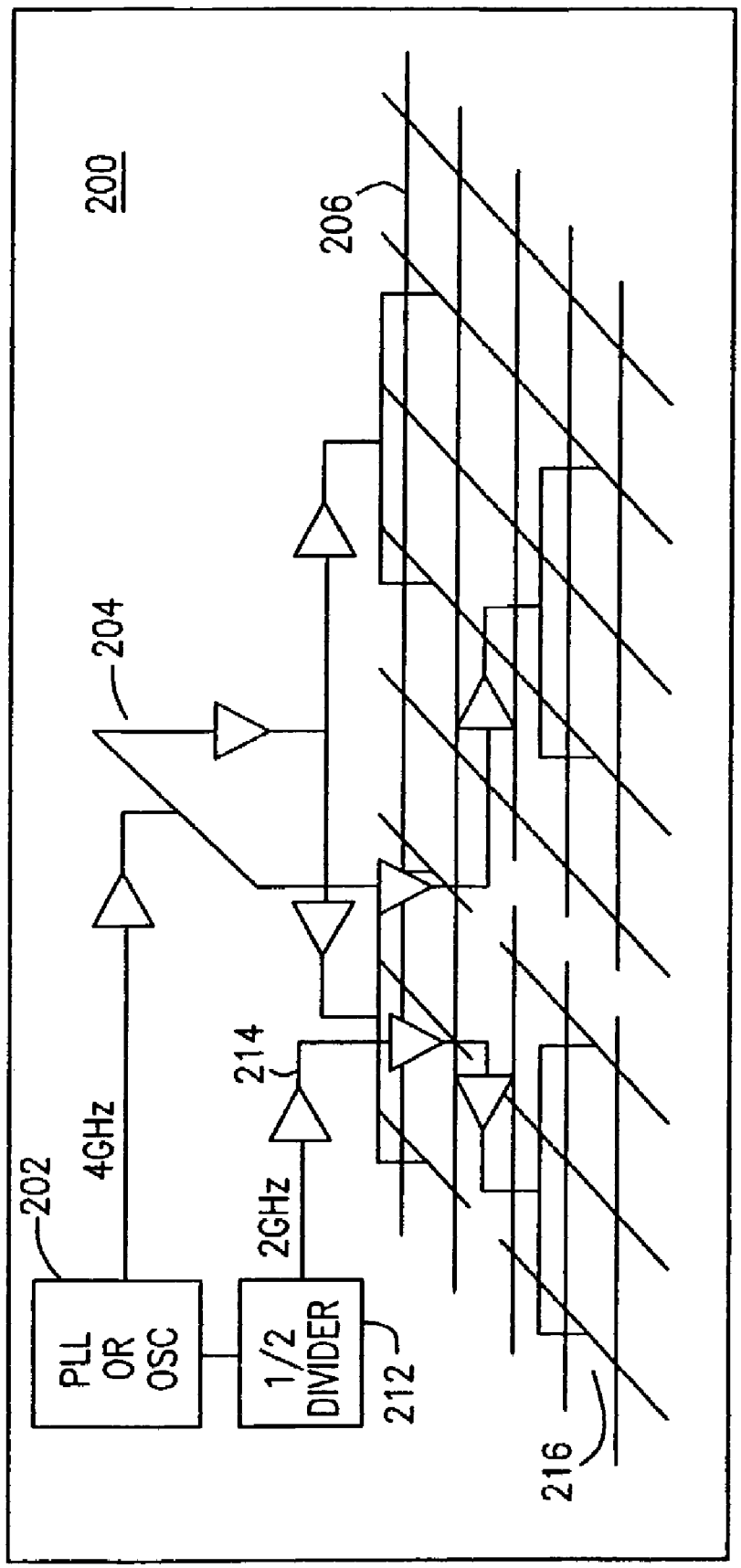
FIG. 2 is a schematic diagram of a circuit in which two separate clock signals, at different frequencies, are distributed to different meshes along separate clock trees.
Figure 3:
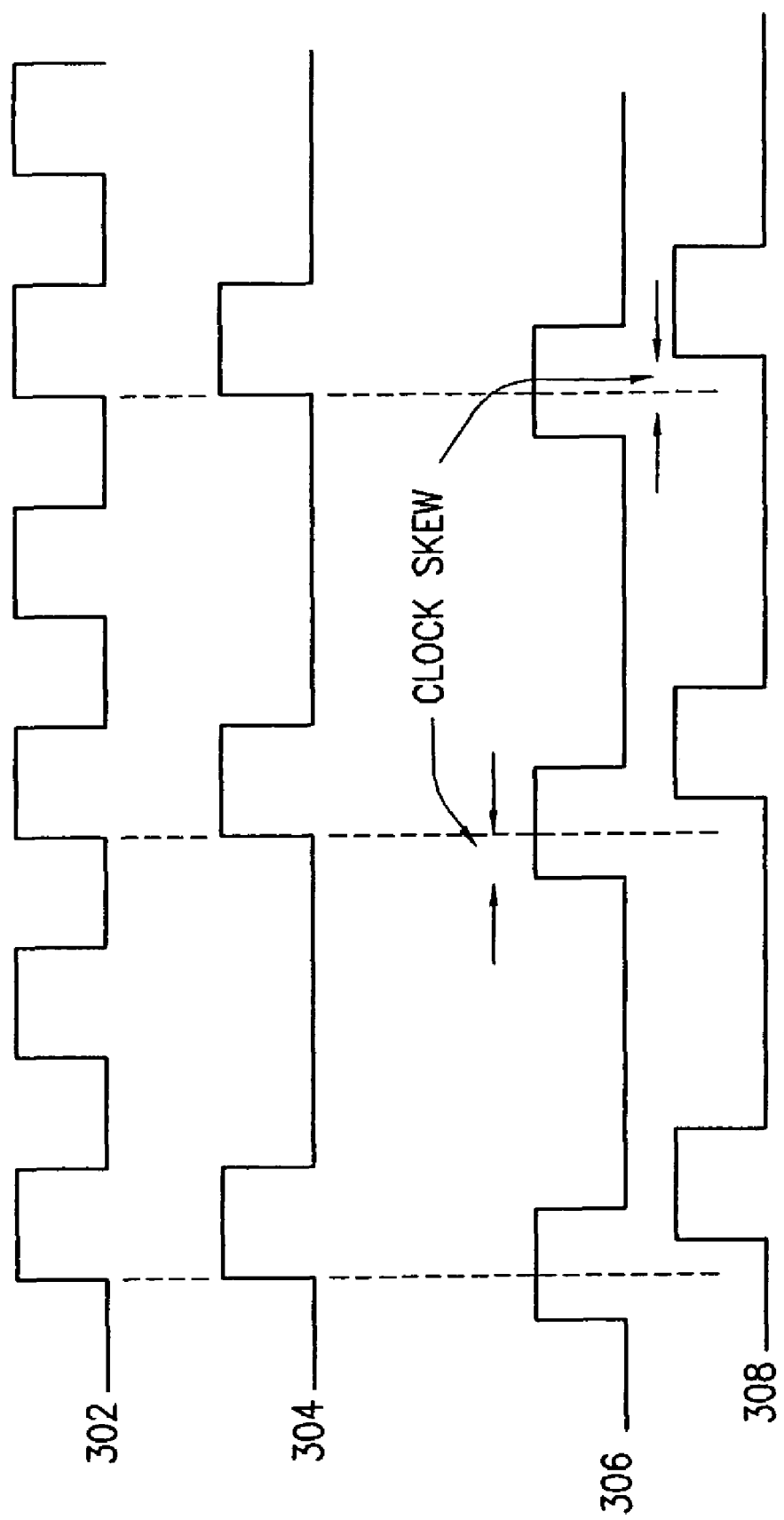
FIG. 3 is a timing diagram illustrating clock skew between the signals within the circuit of FIG. 2.

Herein, a signal generator may be implemented using a PLL, an oscillator or other device capable of generating a periodic signal. Herein, a final buffer may be a clock buffer located at or near a junction between a clock tree and a clock mesh. However, the term "final buffer" is not limited to the foregoing description. Referring now to the drawings, wherein like numerals indicate like elements, there is shown in FIG. 4 a semiconductor device 400, such as an LSI circuit.

Figure 4:
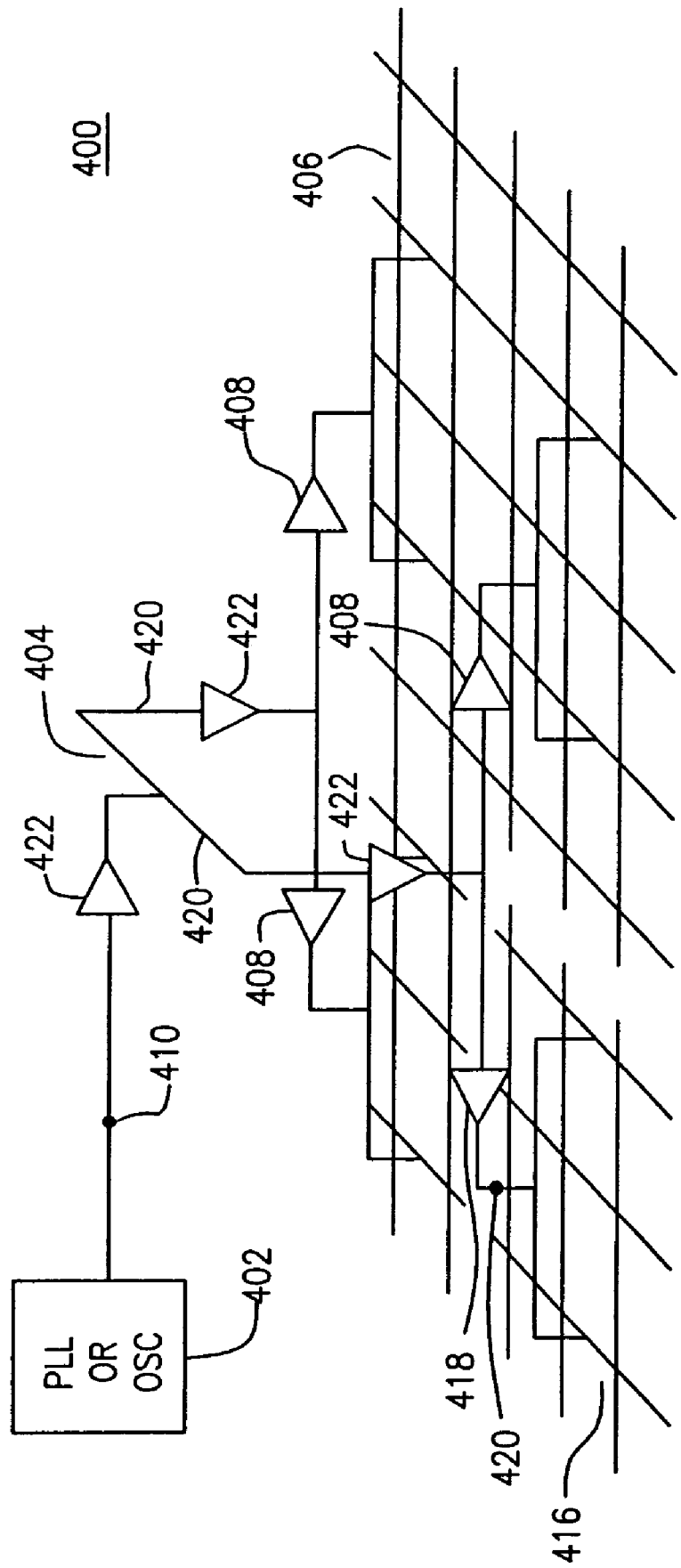
FIG. 4 is a schematic diagram of a circuit in which a first signal from a PLL, oscillator or other clock source is transmitted along a clock tree and divided to provide a second signal at a second frequency at a selected point within the circuit in accordance with one or more embodiments of the present invention.

FIG. 4 is a schematic diagram of a circuit 400 in accordance with one or more embodiments of the present invention. Circuit 400 includes PLL, oscillator or other clock source 402, clock tree 404, a first clock mesh 406, and a second clock mesh 416. Oscillator 402 is a conventional device for providing a periodic signal, and is known in the art. Clock tree 404 includes a network of conductive segments 420, clock buffers 422, and final buffers 408 and 418 to fan the clock signal 410 to multiple points on clock meshes 406 and 416. Clock buffers 422 and final buffers 408 can be inverters or other suitable digital logic devices. Final buffer 418 is discussed in greater detail in connection with FIG. 5. Clock meshes 406 and 416 are grids that carry the clock signal to further circuitry of the LSI circuit. However, clock meshes 406 and 416 are preferably electrically isolated from each other so that they can carry different clock signals.

A first signal 410 from a PLL, oscillator or other clock source 402 is transmitted along a clock tree 404 and divided to provide a second signal 420 at a second frequency at a selected point within the circuit 400 in accordance with one or more embodiments of the present invention. Clock signal 410, which may have a frequency of 4 GHz, preferably propagates along clock tree 404 and branches toward final buffers 408 and 418. Preferably, the composition of final buffers 408 and 418 can be controlled to determine the respective frequencies emerging from these final buffers.

In one embodiment, final buffer 408 does not change the frequency of clock signal 410 and thus transmits clock signal 410 emerging from oscillator 402 to clock mesh 406. Final buffer 418, however, preferably operates to divide the frequency of clock signal 410 by a divisor to provide signal 420. Final buffer 418 is preferably also operable to synchronize signal 420 with signal 410. In this manner, signal 420, having a different frequency from signal 410, but still synchronized therewith, may be provided to clock mesh 416.

In one embodiment, clock signal 410 has a frequency of 4 GHz, the divisor within final buffer 418 has a value of "2," and signal 420 thus has a frequency of 2 GHz. However, it will be appreciated that clock signal 410 may have a frequency either higher or lower than 4 GHz. Moreover, divisors greater than or less than 2 may be employed for frequency division within final buffer 418. For example, the divisor may be 2, 3, 4, . . . , in order to reduce the frequency of clock signal 420 as compared to clock signal 410. Alternatively, the value of the divisor may be set to a very high value, thereby causing the resulting frequency to approach or equal zero, which would cut off the clock signal to the clock mesh 416. All such variations are intended to be included within the scope of the present invention.

Synchronizing signal 420 with signal 410 at such an advanced stage of signal propagation within circuit 400 preferably operates to minimize clock skew between these two signals. It is noted that the particular position of the final buffer 418, and thus the position at which frequency division and synchronization occur, is preferred but not mandatory to practice various aspects of the invention. Signal synchronization may be implemented more than once within circuit 400. Furthermore, signal synchronization is not limited to situations involving signals having different frequencies, but may also be used to synchronize signals having the same or substantially the same frequency.

Figure 5:
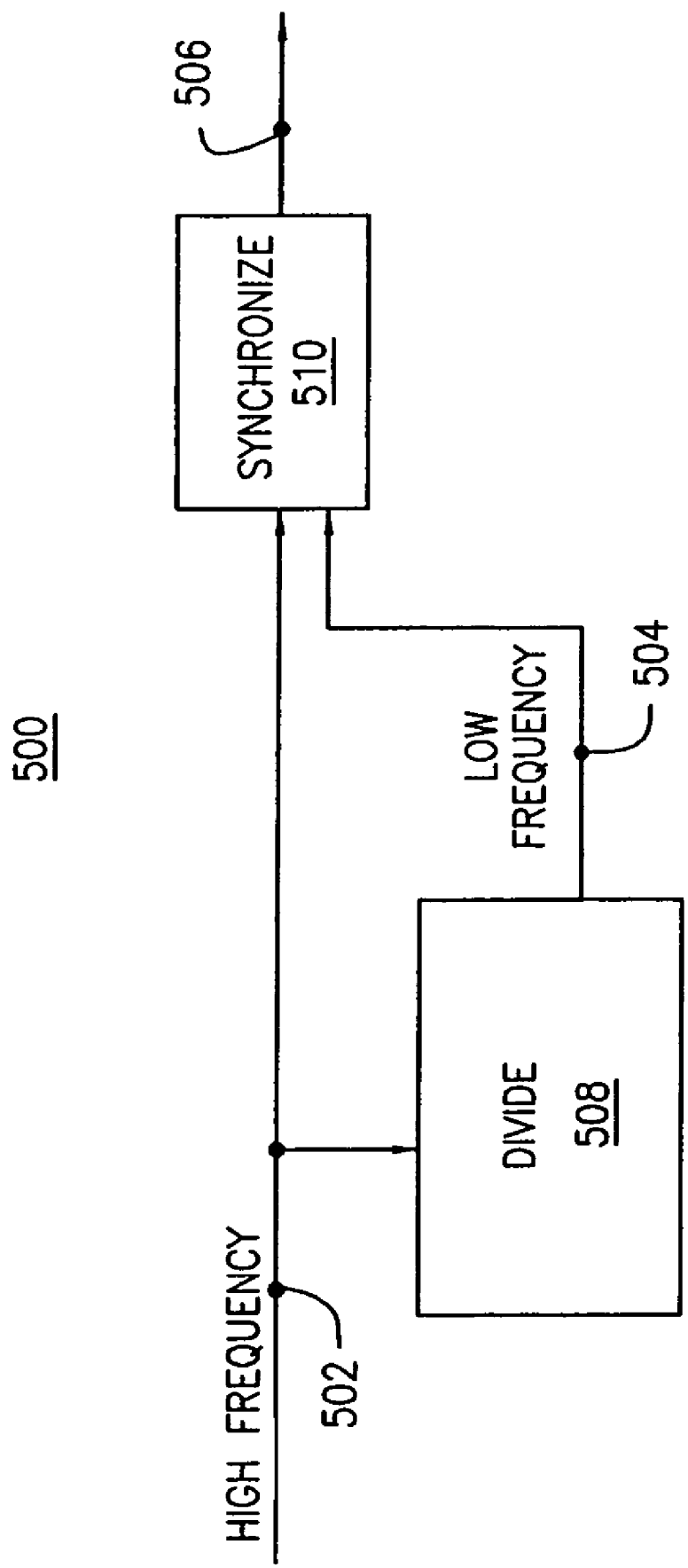
FIG. 5 is a block diagram of a circuit employing frequency division and signal synchronization in accordance with one or more embodiments of the present invention.
Figure 6:
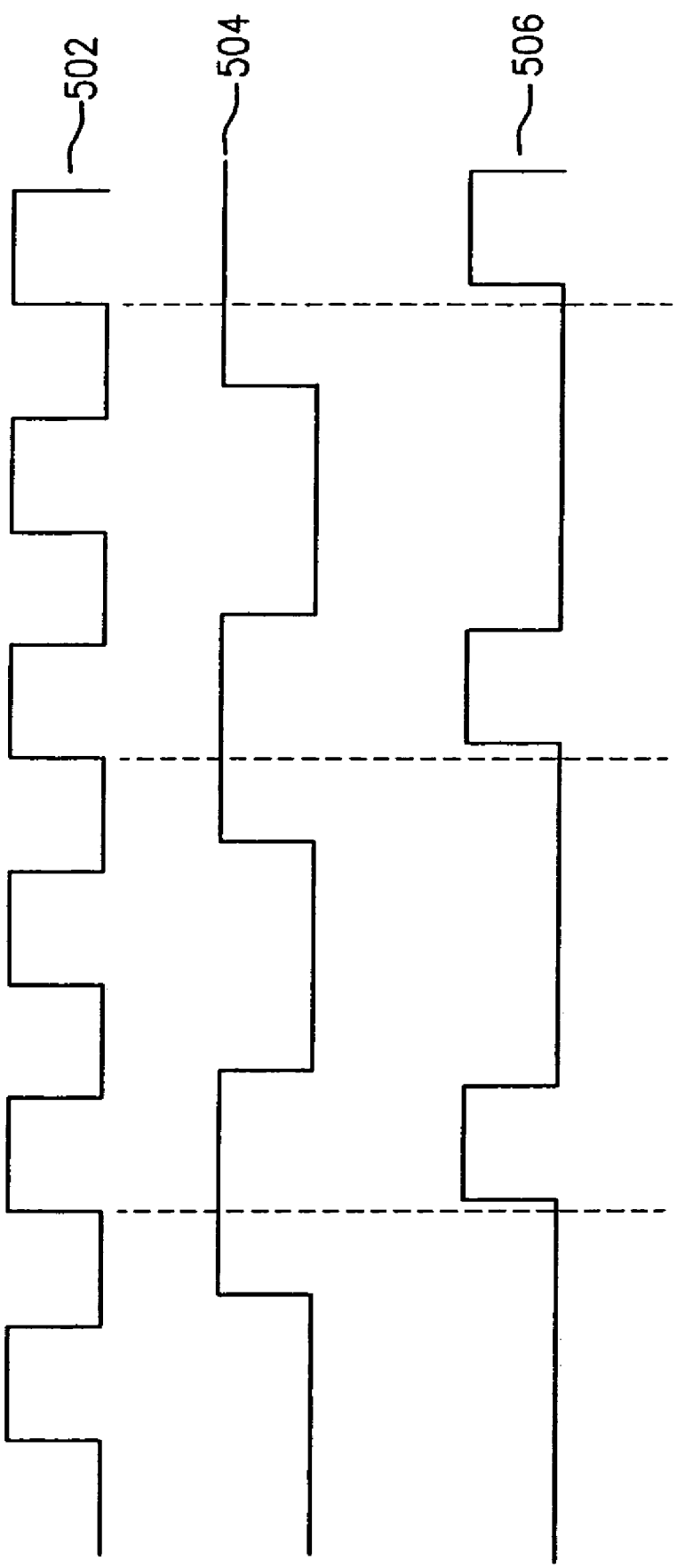
FIG. 6 is a timing diagram providing a time-domain representation of signals at specified points in the circuit of FIG. 5.

Reference is now made to FIGS. 5 and 6, where FIG. 5 is a block diagram of a circuit 500 that is suitable for implementing the final buffer 418 of FIG. 4 in accordance with one or more embodiments of the present invention. FIG. 6 is a timing diagram providing time-domain representations of signals at specified points in the circuit 500 of FIG. 5.

Circuit 500 preferably includes frequency division circuit 508 and synchronization circuit 510. In this embodiment, high frequency signal 502, which may have a frequency of 4 GHz, is preferably input to frequency division circuit 508 as well as to synchronization circuit 510. It is noted that high frequency signal 502 may coincide with the high frequency clock signal input into final buffer 418 of FIG. 4. Frequency division circuit 508 is preferably operable to divide the frequency of the high frequency signal 502 by the value of a divisor and to produce an output signal (low frequency signal 504) having a frequency equal to the result, or dividend, of the division. High frequency signal 502 and low frequency signal 504 are input into synchronization circuit 510. Assuming that high frequency signal 502 has a frequency of 4 GHz, and a divisor of 2 is used, low frequency signal 504 will have a frequency of 2 GHz. Synchronization circuit 510 preferably synchronizes low frequency signal 504 with high-frequency signal 502 to produce output signal 506. It is noted that the output signal 506 may coincide with the signal 420 of FIG. 4. As will be discussed further below, synchronization circuit 510 is preferably operable to synchronize at least one characteristic of the low frequency signal 504 with at least one respective characteristic of the high frequency signal 502 to produce synchronized output signal 506. For instance, in one embodiment, the rising edge of output signal 506 may be synchronized with the rising edge of the high frequency signal 502. Preferably, synchronization circuit 510 does not change the frequency of low frequency signal 504 in generating output signal 506. However, in alternative embodiments, the frequency of output signal 506 may differ from the frequency of low frequency signal 504.

Depending upon the needs of a larger circuit within which circuit 500 is located, output signal 506 may be directed to an inverter, buffer, or other circuit or component after emerging from synchronization circuit 510.

The described functions of frequency division circuit 508 and synchronization circuit 510 could be provided by one or more digital logic gates. For example, frequency division circuit 508 may be implemented using one or more flip-flop circuits. Synchronization circuit 510 may be implemented using one or more logic gates.

FIG. 6 illustrates time-domain plots of signals 502, 504, and 506 assuming a particular implementation of the frequency division circuit 508 and the synchronization circuit 510. As shown, low frequency signal 504 has a frequency of about one half that of high frequency signal 502. It is noted, however, that the rising edges of the high and low frequency signals 502, 504 are not substantially coincident due to the frequency division circuit operation time. Owing to the synchronization circuit 510, the rising edges of output signal 506 are closely synchronized with those of high-frequency signal 502. It is noted that a small delay between the rising edges may be due to the propagation time of high and low frequency signals 502, 504 through synchronization circuit 510. However, the amount of the delay can be controlled in synchronization circuitry design. In this embodiment, it is the rising edges of signals 502 and 506 that are synchronized, thereby implementing a Boolean AND operation on the inputs. Other Boolean operations including but not limited to OR, NOR, and NAND operations may be employed for synchronization purposes, and all such variations are intended to be included within the scope of the present invention.

Figure 7:
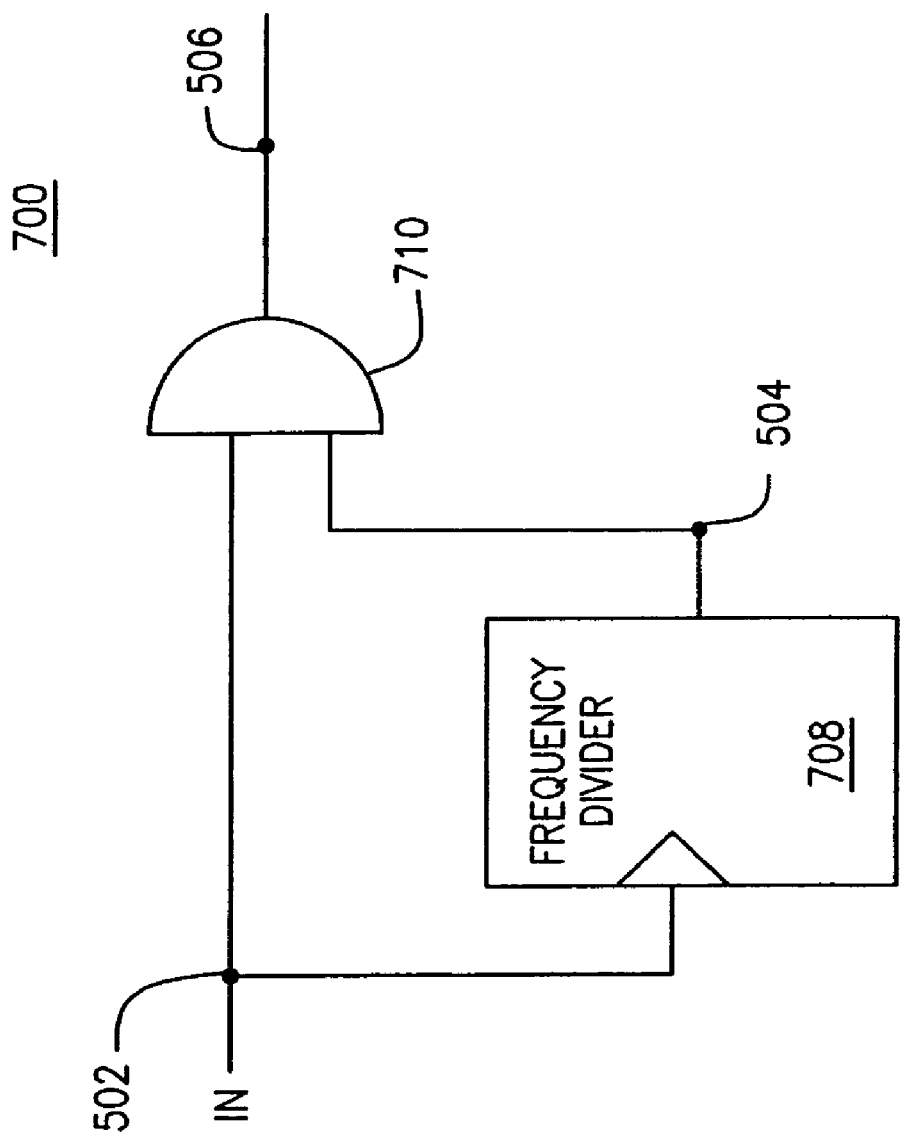
FIG. 7 is a schematic diagram of a circuit for implementing frequency division and signal synchronization in accordance with one or more embodiments of the present invention.

Reference is now made to FIGS. 6 and 7, where FIG. 7 is a schematic diagram of a circuit 700 suitable for implementing the frequency division and signal synchronization circuit 500 of FIG. 5 in accordance with one or more embodiments of the present invention. It may be seen that the synchronization shown in FIG. 6 corresponds to a logical "AND" operation being performed using signals 502 and 504 as inputs and providing signal 506 as an output. In this regard, circuit 700 preferably includes frequency divider 708 and AND gate 710. Frequency divider 708 may be implemented employing a flip flop circuit and is preferably operable to divide the frequency of the high frequency signal 502 by the value of a divisor and to provide the low frequency signal 504 having a frequency equal to the result, or dividend, of the division. AND gate 710 may be a conventional digital logic gate which receives the high and low frequency signals 502, 504 as inputs and provides output signal 506. The structure and operation of circuit 700 are substantially similar to those of the circuit 500 shown in FIG. 5, except that in circuit 700, AND gate 710 is shown performing the synchronization operation. Following the well known truth table of AND gates, the output of AND gate 710 is high only when both inputs thereto are high. Thus, as shown in FIG. 6, output signal 506 is the result of a logical AND operation being performed on high-frequency input signal 502 and low-frequency signal 504. Output signal 506 preferably exhibits the frequency of low-frequency signal 504, where the rising edges thereof are synchronized with the rising edges of high-frequency signal 502.

It is noted that in alternative embodiments of the circuit 500 of FIG. 5, synchronization may be accomplished by coordinating the falling edges of signals 502 and 506. In other embodiments, the rising edge of signal 502 may be synchronized with the falling edge of signal 506. In further embodiments, the falling edge of signal 502 could be synchronized with the rising edge of signal 506. Other variations of the disclosed synchronization scheme will be apparent to those of ordinary skill in the art.

Figure 8:
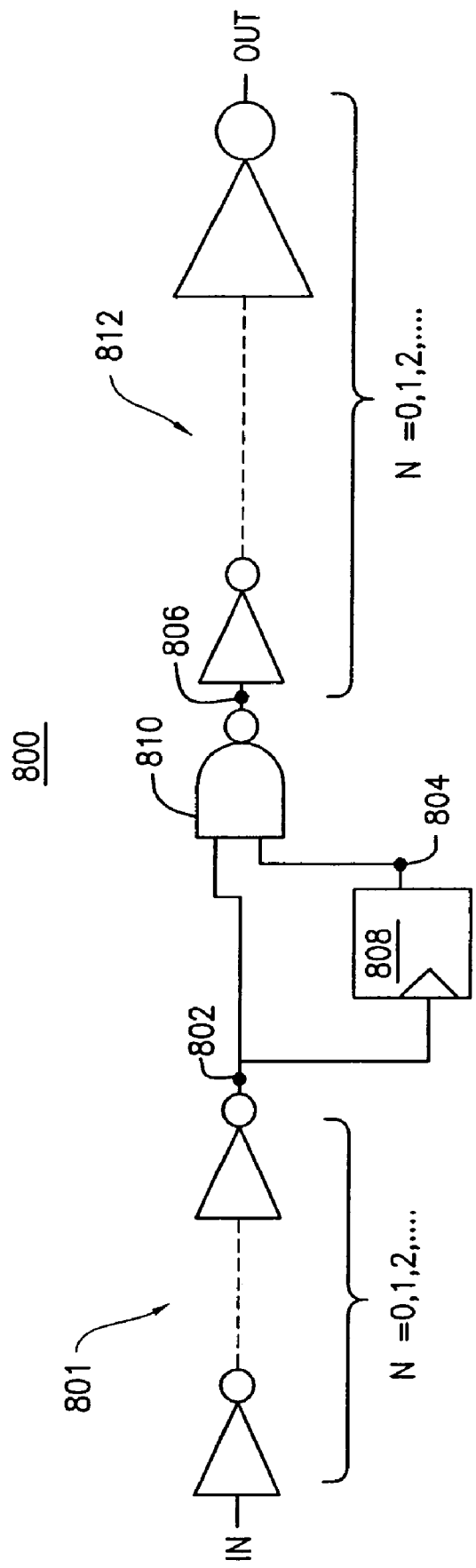
FIG. 8 is a schematic diagram of a circuit for synchronizing signals in accordance with an alternative embodiment of the present invention.

FIG. 8 is a schematic diagram of a circuit 800 in accordance with an alternative embodiment of the present invention. Circuit 800 includes first plurality of inverters 801, frequency divider 808, NAND gate 810 and second plurality of inverters 812. The first plurality of inverters 801 may represent a number of the buffers for the purpose of waveform shaping, buffer size requirements, timing adjustments, physical design requirements, or any other design requirements. In alternative embodiments, inverters 801 may be substituted with non-inverting buffers. Frequency divider 808 is preferably substantially similar to the divider 708 of FIG. 7 in that it is operable to divide the frequency of a high frequency signal 802 by the value of a divisor and to provide a low frequency signal 804 having a frequency equal to the result, or dividend, of the division. NAND gate 810 is a conventional digital logic gate which receives high and low frequency signals as inputs and provides an output signal 806. Following the well known truth table of NAND gates, the output of NAND gate 810 is low only when both inputs thereto are high. In this regard, output signal 806 preferably has the frequency of low-frequency signal 804 and is preferably synchronized with high-frequency input signal 802. In this embodiment, the falling edge of output signal 806 is synchronized with the rising edge of high-frequency signal 802. The output signal 806 is input to the second plurality of inverters 812. The second plurality of inverters 812 may represent a number of the buffers for the purpose of waveform shaping, buffer size requirements, timing adjustments, physical design requirements, or any other design requirements. In alternative embodiments, inverters 812 may be substituted with non-inverting buffers.

Figure 9:
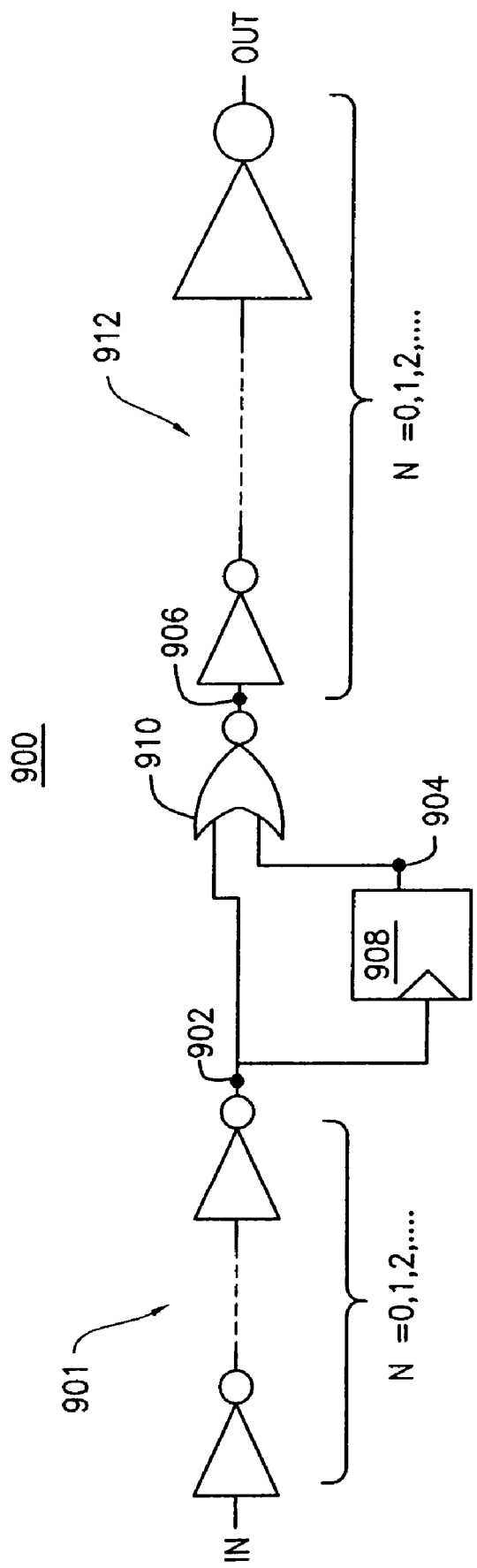
FIG. 9 is a schematic diagram of a circuit for synchronizing signals in accordance with an alternative embodiment of the present invention.

FIG. 9 is a schematic diagram of a circuit 900 in accordance with an alternative embodiment of the present invention. Circuit 900 includes first plurality of inverters 901, frequency divider 908, NOR gate 910 and second plurality of inverters 912. The first plurality of inverters 901 may represent a number of the buffers for the purpose of waveform shaping, buffer size requirements, timing adjustments, physical design requirements, or any other design requirements. In alternative embodiments, inverters 901 may be substituted with non-inverting buffers. Frequency divider 908 is preferably substantially similar to the divider 708 of FIG. 7 in that it is operable to divide the frequency of a high frequency signal 902 by the value of a divisor and to provide a low frequency signal 904 having a frequency equal to the result, or dividend, of the division. NOR gate 910 is a conventional digital logic gate which receives high and low frequency signals 902, 904 as inputs and provides an output signal 906. Following the well known truth table of NOR gates, the output of NOR gate 910 is high only when both inputs thereto are low. In this regard, output signal 906 preferably has the frequency of low-frequency signal 904 and is preferably synchronized with high-frequency input signal 902. In this embodiment, the rising edge of output signal 906 is synchronized with the falling edge of high-frequency signal 902. The output signal 906 is input to the second plurality of inverters 912. The second plurality of inverters 912 may represent a number of the buffers for the purpose of waveform shaping, buffer size requirements, timing adjustments, physical design requirements, or any other design requirements. In alternative embodiments, inverters 912 may be substituted with non-inverting buffers.

It is noted that the methods and apparatus described thus far and/or described later in this document may be achieved utilizing any of the known technologies, such as standard digital circuitry, analog circuitry, microprocessors, digital signal processors, any of the known processors that are operable to execute software and/or firmware programs, programmable digital devices or systems, programmable array logic devices, or any combination of the above, including devices now available and/or devices which are hereinafter developed. One or more embodiments of the invention may also be embodied in digital circuitry in LSI circuits.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. Apparatus, comprising:
   a signal generator providing a first signal having a first frequency;
   a clock tree operative to propagate said first signal to at least one clock mesh of said apparatus; and
   a final buffer operative to receive said first signal, provide a second signal having a second frequency, synchronize said second signal with said first signal, and propagate said synchronized second signal to at least one other clock mesh of said apparatus.

2. The apparatus of claim 1 wherein said final buffer is operable to divide said first frequency by a divisor to provide said second signal having said second frequency.

3. The apparatus of claim 2 wherein said clock tree is connected to said signal generator.

4. The apparatus of claim 3 wherein said at least one clock mesh is connected to said clock tree.

5. The apparatus of claim 4 wherein said at least one clock mesh comprises a plurality of clock meshes.

6. The apparatus of claim 1 wherein said final buffer comprises:
   a frequency divider for receiving said first signal and providing said second signal having said second frequency; and
   a synchronization circuit for synchronizing said second signal with said first signal.

7. The apparatus of claim 6 wherein said frequency divider comprises a flip flop circuit operable to receive said first signal, divide said first frequency by a divisor, and provide said second signal having said second frequency to said synchronization circuit.

8. The apparatus of claim 6 wherein said synchronization circuit comprises a digital logic circuit operable to receive said first signal and said second signal, to perform at least one logical operation on said first and second signals, and to provide as an output said synchronized second signal.

9. The apparatus of claim 8 wherein said digital logic circuit comprises at least one of: an AND gate, a NAND gate, an OR gate, and a NOR gate.

10. The apparatus of claim 1 wherein said second frequency is lower than said first frequency.

11. The apparatus of claim 6 wherein said frequency divider is operable to:

discontinue said propagation of said synchronized second signal to said at least one other clock mesh.

12. The apparatus of claim 6 wherein said synchronization circuit is operable to at least one of:

synchronize a rising edge of said second signal with a rising edge of said first signal;

synchronize a falling edge of said second signal with a falling edge of said first signal;

synchronize a rising edge of said second signal with a falling edge of said first signal; and synchronize a falling edge of said second signal with a rising edge of said first signal.

13. A method, comprising:

providing a first signal having a first frequency;

propagating said first signal through a clock tree to at least one clock mesh of an apparatus;

generating a second signal having a second frequency;

synchronizing said second signal with said first signal; and propagating said synchronized second signal to at least one other clock mesh of said apparatus.

14. The method of claim 13 wherein said generating said second signal comprises dividing said first frequency by a divisor.

15. The method of claim 14 wherein said divisor is about 2.

16. The method of claim 13 wherein said synchronizing comprises:

synchronizing said second signal with said first signal employing a digital logic circuit.

17. The method of claim 16 wherein said synchronizing employing said digital logic circuit comprises:

receiving said first and second signals;

performing at least one logical operation on said first and second signals; and providing as output from said digital logic circuit said synchronized second signal.

18. The method of claim 16 wherein said digital logic circuit comprises:

at least one of: an AND gate, a NAND gate, an OR gate, and a NOR gate.

19. The method of claim 14 wherein said dividing comprises:

discontinuing said propagation of said synchronized second signal to said at least one other clock mesh.

20. The method of claim 13 wherein said synchronizing comprises at least one of:

synchronizing a rising edge of said second signal with a rising edge of said first signal;

synchronizing a falling edge of said second signal with a falling edge of said first signal;

synchronizing a rising edge of said second signal with a falling edge of said first signal; and synchronizing a falling edge of said second signal with a rising edge of said first signal.

* * * * *